(12) United States Patent
Yoshida

(10) Patent No.: US 6,523,082 B1
(45) Date of Patent: Feb. 18, 2003

(54) SYSTEMS HAVING SHARED MEMORY AND BUSES

(75) Inventor: Toshikazu Yoshida, Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/506,273

(22) Filed: Feb. 17, 2000

(30) Foreign Application Priority Data

Feb. 25, 1999 (JP) .......................................... 11-047523

(51) Int. Cl.[7] .............................................. G06F 13/20
(52) U.S. Cl. ...................................... 710/313; 710/306
(58) Field of Search ................................ 710/313, 306

(56) References Cited

U.S. PATENT DOCUMENTS 5,557,757 A * 9/1996 Gephardt et al. ........... 710/306
6,081,883 A * 6/2000 Popelka et al. ............... 712/28
6,266,731 B1 * 7/2001 Riley et al. ................. 710/105

OTHER PUBLICATIONS

Accelerated Graphics Port Interface Specification Revision 2.0, May 4, 1998, p. 20.*

* cited by examiner

Primary Examiner—Rupal Dharia
Assistant Examiner—David Glass
(74) Attorney, Agent, or Firm—Dickstein Shapiro Morin & Oshinsky LLP

(57) ABSTRACT

In a system having a plurality of CPUs connected to a plurality of corresponding bus bridges which are connected in tandem, one of the plurality of bus bridges is associated with a memory storing boot programs for activating the plurality of CPUs. The CPU connected to the bus bridge associated with the memory gains access to the memory by accessing a predetermined address of the bus bridge. The remaining CPUs gain accesses to the same address as the predetermined address, of the bus bridges to which are connected respective CPUs. The thus accessed bus bridges have accesses to the memory by accessing the same address as the predetermined address, of the other bus bridges adjacent toward the bus bridge associated with the memory.

6 Claims, 17 Drawing Sheets

FIG. 6A   Memory map of bus bridge 11
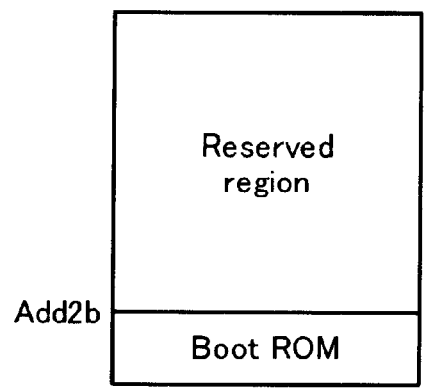
FIG. 6B   Memory map of bus bridge 12
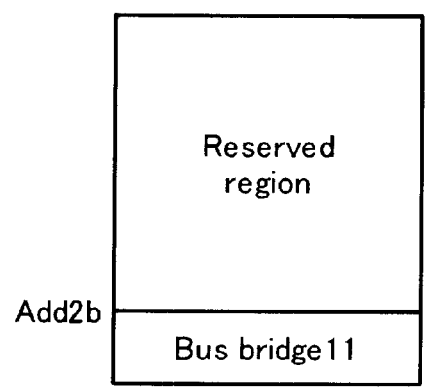
FIG. 6C   Memory map of bus bridge 1n
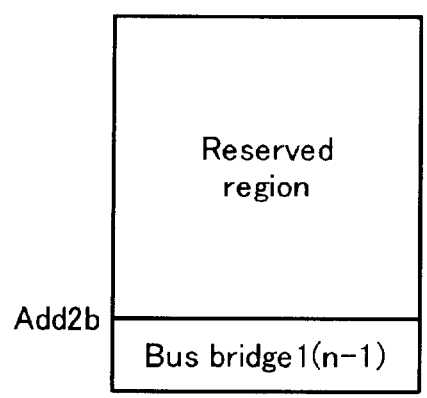

FIG. 7A  Memory map of CPU1
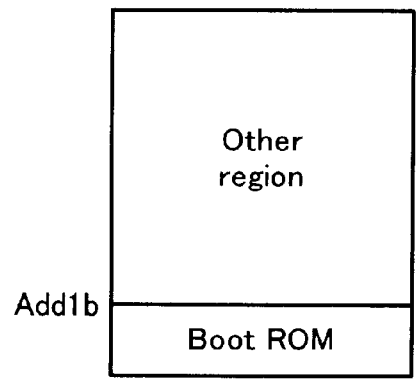
FIG. 7B  Memory map of CPU2
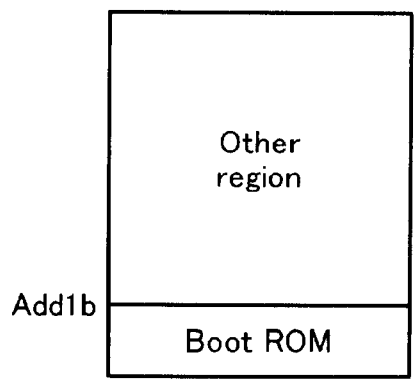
FIG. 7C  Memory map of CPUn
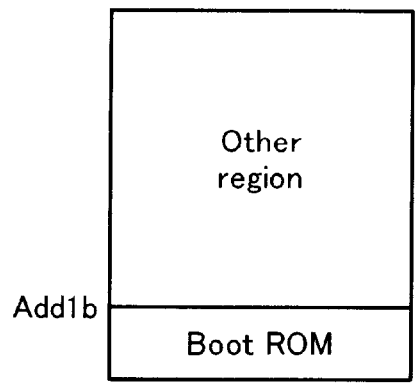

SYSTEMS HAVING SHARED MEMORY AND BUSES

BACKGROUND OF THE INVENTION

1. Field of the Invention

The present invention relates to a system having a boot ROM shared by a plurality of CPUs, and to a system having a PCI or AGP bus, etc., of which part is shared by the other busses.

2. Description of the Related Art

Typical systems utilizing computer graphics have often subjected a model consisting of a multiplicity of polygons to high-speed rendering and made use of a plurality of CPUs due to the need to move the model at a high speed. In such a case, for example, individual boot ROMs corresponding to the plurality of CPUs have stored respective activation programs dedicated to the respective CPUs. Otherwise, a single boot ROM linked to CPU busses have had segmented storage regions each storing an activation program dedicated to each CPU, for activation of each CPU.

FIG. 14 illustrates a schematic configuration of a conventional system having a plurality of boot ROMs linked to corresponding CPU busses. In this system, CPUs 1 to n are connected via CPU busses 21 to 2n, respectively, to bus bridges 11 to 1n, respectively. The bus bridges 11 to 1n are connected in tandem by way of PCI (peripheral component inter-contact) or AGP (accelerated graphics port) busses.

Then, the CPU busses 21 to 2n connect respectively to boot ROMs 61 to 6n each storing an activation program dedicated to the corresponding CPU in order to ensure that upon activation the CPUs can read the respective activation programs from the boot ROMs associated therewith.

FIG. 15 illustrates a schematic configuration of a conventional system having a plurality of boot ROMs coupled to corresponding bus bridges. In such a case, the boot ROMs 61 to 6n are connected via the bus bridges 11 to 1n to the CPUs 1 to n. In this case as well, the CPUs read the respective activation programs from the associated boot ROMS, for respective activations.

In case of coupling the boot ROMs 61 to 6n to the bus bridges 11 to 1n, respectively, as seen in FIG. 15, it is difficult to directly connect the boot ROMs 61 to 6n to the bus bridges 11 to 1n if the bus bridges 11 to 1n are bus bridges intended for the PCI or AGP bus. The following measures are thus taken.

For example, as shown in FIG. 16, a bus bridge 91 allowing connection of a bus 81 for boot ROM is provided and linked to the bus bridge 11 connecting the CPU bus 21 and a PCI or AGP bus 51. Alternatively, as can be seen in FIG. 17, the bus bridge 11 connecting the CPU bus 21 and the PCI or AGP bus 51 is provided with a bus interface 92 allowing a connection of the bus 81 for boot ROM so that connection of the boot ROM 61 can be achieved through the bus interface 92.

Although FIGS. 16 and 17 depict the case where the boot ROM 61 is connected to the bus bridge 11 for PCI or AGP bus, the same applies to the case where other devices incapable of direct connection to the PCI or AGP bus are linked to the PCI or AGP bus.

However, use of individual boot ROMS for activations of a plurality of CPUs may result in an increased number of boot ROMs used, giving birth to a rise in system costs. Also, in the event of segmenting the storage area of a single boot ROM into a plurality of storage regions each storing therein an activation program dedicated to each CPU, the boot ROM must have a larger storage capacity, and connection of the boot ROM to the CPU busses may cause a greater load on the CPU busses at the time of activations, thus making it difficult to ensure a high-speed activation.

Furthermore, in order to connect the bus for boot ROM to the PCI or AGP bus, there is a need for a bus bridge dedicated to that application, resulting in a rise in system costs. In case of providing the bus bridge for PCI or AGP bus with the bus interface allowing connection of other busses, the bus bridge must have an increased number of pins, which will also result in a rise in the system costs.

SUMMARY OF THE INVENTION

It is therefore an object of the present invention to provide a system including a plurality of CPUs which can be activated by a single boot ROM having a reduced storage area required.

Another object of the present invention is to reduce the number of pins of a bus bridge for PCI or AGP bus when any devices incapable of direct connection to a PCI or AGP bus are linked to the bus bridge for PCI or AGP, thereby to achieve a cutdown in costs of the system.

The above object is attained by providing a system having a plurality of CPUs connected to a plurality of corresponding bus bridges which are connected in tandem, wherein one of the plurality of bus bridges is associated with a memory which stores therein a common boot program for activating the plurality of CPUs in common, and individual boot programs for activating individually the plurality of CPUs, and wherein the CPU connected to the bus bridge associated with the memory gains access to the memory by accessing a predetermined address of the bus bridge, and wherein the remainder of the plurality of CPUs gain access to the same address as the predetermined address, of the bus bridges to which the remainder are respectively connected, the thus accessed bus bridge having access to the memory by accessing the same address as the predetermined address, of the other bus bridges adjacent toward the bus bridge associated with the memory.

According to the present invention, one of the plurality of bus bridges is associated with the memory which stores therein a common boot program for activating the plurality of CPUs in common and individual boot programs for individually activating the plurality of CPUS, whereby it is possible to share the single memory for activation by the plurality of CPUs in order to curtail the system costs.

According to the present invention, memory maps of the respective bus bridges are configured such that the adjoining bus bridges for access to the memory have the same address, so that memory maps of the respective CPUs can have the same memory address. Thus, a plurality of CPUs can be activated by a single memory in the system having the plurality of CPUs for execution of high-speed image processing, thereby achieving a cutdown in system costs. In addition, the memory is located at the same address in the respective memory maps of the plurality of CPUs, so that the programs are simplified with easy creation thereof.

According to the present invention, the single memory separately stores therein a common boot program common to the plurality of CPUs and individual boot programs, with the result that it is possible to reduce the storage area of the memory as well as to curtail the system costs.

The above object is achieved by providing a system having a CPU, a bus bridge connected to the CPU and connected via a predetermined bus to a predetermined device, and another device connectable to another bus different from the predetermined bus, wherein the another device is connected to the bus bridge by way of part of the predetermined bus, the CPU gaining access to the another device by way of part of the predetermined bus.

According to the present invention, part of a predetermined bus is used in common, for access to the other device connectable to another bus different from the predetermined bus, whereby the number of pins can remarkably be reduced as compared with the case where the bus bridges are each provided with an interface for another bus for direct connection to the other device, thus cutting down costs of the bus bridges and of the entire system.

BRIEF DESCRIPTION OF THE DRAWINGS

The above and other aspects, objects, features and advantages of the present invention will become more apparent from the following detailed description in light of the accompanying drawings, in which:

FIGS. 6A to 6C illustrate memory maps of bus bridges of the embodiment of the present invention;

FIGS. 7A to 7C illustrate memory maps of CPUs of the embodiment of the present invention;

DESCRIPTION OF THE PREFERRED EMBODIMENT

Figure 1:
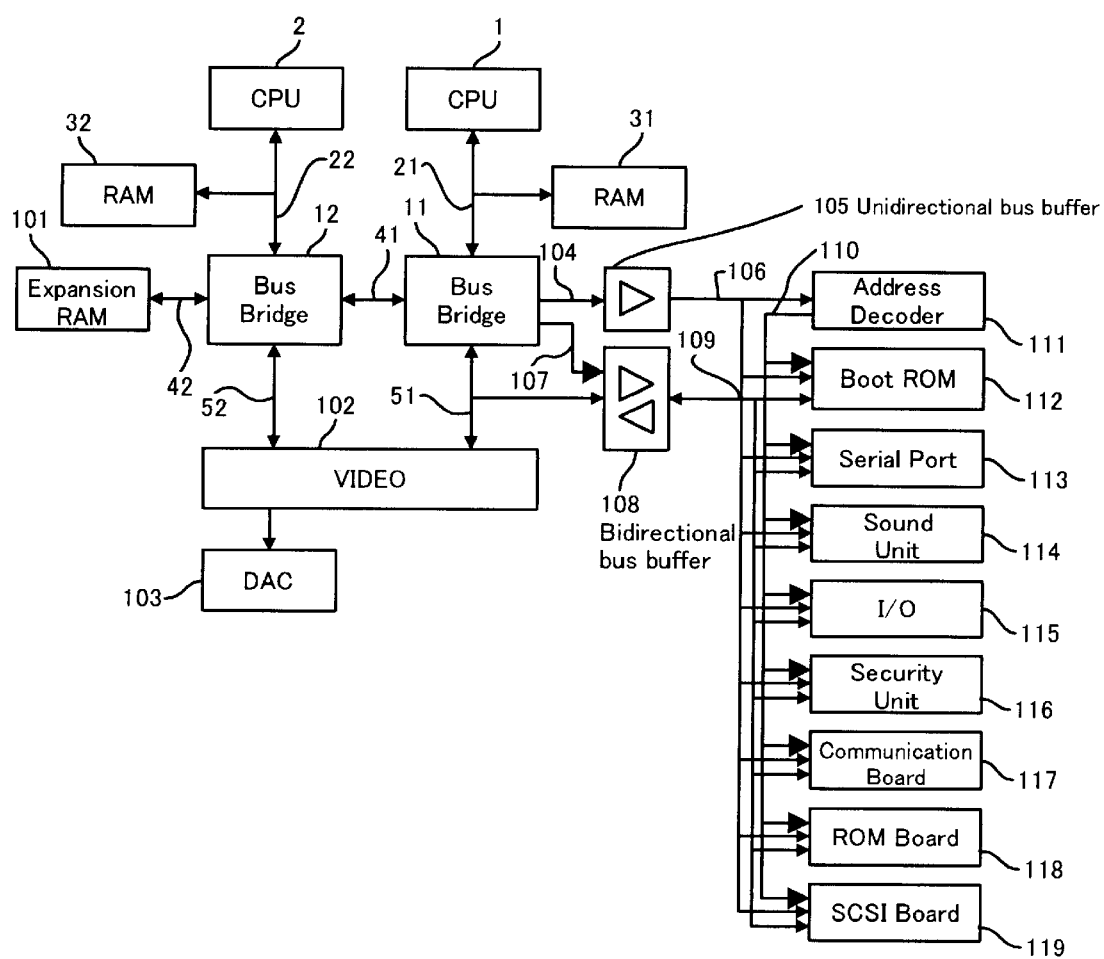
FIG. 1 is a configuration diagram of a game system in accordance with an embodiment of the present invention.

The present invention will now be described with reference to the accompanying drawings which illustrate preferred embodiments in a non-limitative manner. FIG. 1 is a configuration diagram of a game system in accordance with an embodiment of the present invention. The game system of this embodiment comprises CPUs 1 and 2 which are connected to bus bridges 11 and 12, respectively, by way of CPU busses 21 and 22, respectively, so as to execute high-speed image processing or the like in computer graphics.

RAMs 31 and 32 lead to the CPU busses 21 and 22, respectively, the bus bridges 11 and 12 being connected in tandem by a PCI or AGP bus 41. A video processor unit 102 communicates with the bus bridges 11 and 12 through PCI or AGP busses 51 and 52, respectively. The video processing unit 102 carries out rendering or other processing for polygonal models and provides resultant data to a D/A converter 103.

A bidirectional bus buffer 108 is connected to the bus bridge 11 by way of part (AD, CBE bus) of the PCI or AGP bus 51 and a signal line 107, the bidirectional bus buffer 108 being linked via a data bus 109 to a boot ROM 112, serial port 113, a sound unit 114, I/O unit 115, a security unit 116, a communication board 117, a ROM board 118 and an SCSI board 119.

A unidirectional bus buffer 105 communicates through a signal line 104 with the bus bridge 11 and feeds an address signal or other signals via a signal line 106 to an address decoder 111, the boot ROM 112, the serial port 113, the sound unit 114, the I/O unit 115, the security unit 116, the communication board 117, the ROM board 118 and the SCSI board 119. In response to the address signal received, in such a case, the address decoder 111 provides a device selection signal as its output to the boot ROM 112, the serial port 113, the sound unit 114, the I/O unit 115, the security unit 116, the communication board 117, the ROM board 118 and the SCSI board 119. In the event of expanding functions of the game system, an expansion RAM 101 is connected to the bus bridge 12 by way of a bus 42 for expansion RAM. In this event, the expansion RAM 101 is an SD-RAM and the bus 42 is a bus allowing a connection to the SD-RAM.

In this manner, the game system of this embodiment is configured such that the single boot ROM 112 is shared by a plurality of CPUs for their respective activations and that part of the PCI or AGP bus 51 serves also as the signal line allowing access to the boot ROM 112 and other elements, thereby making it possible to reduce the number of pins of the bus bridge 11, contributing to a cutdown in costs of the game system.

If the boot ROM is provided on the CPU bus as in the prior art, the CPU bus becomes associated with three devices (ROM, RAM and bus bridge), with the result that the load on the CPU bus (time required for charging to a certain voltage level) may become larger, resulting in a lower signal speed. In the game system of this embodiment, therefore, the boot ROM 112 does not directly connect to the CPU bus, but instead connects via the bus bridge 11 thereto.

Referring then to FIGS. 2 to 12, description will be made of actions of the plurality of CPUs activated by the single boot ROM in the game system of this embodiment. Although FIG. 1 depicts the game system using two CPUs, the activation of the game system by use of n CPUs is described more generally in FIGS. 2 to 12.

Figure 2:
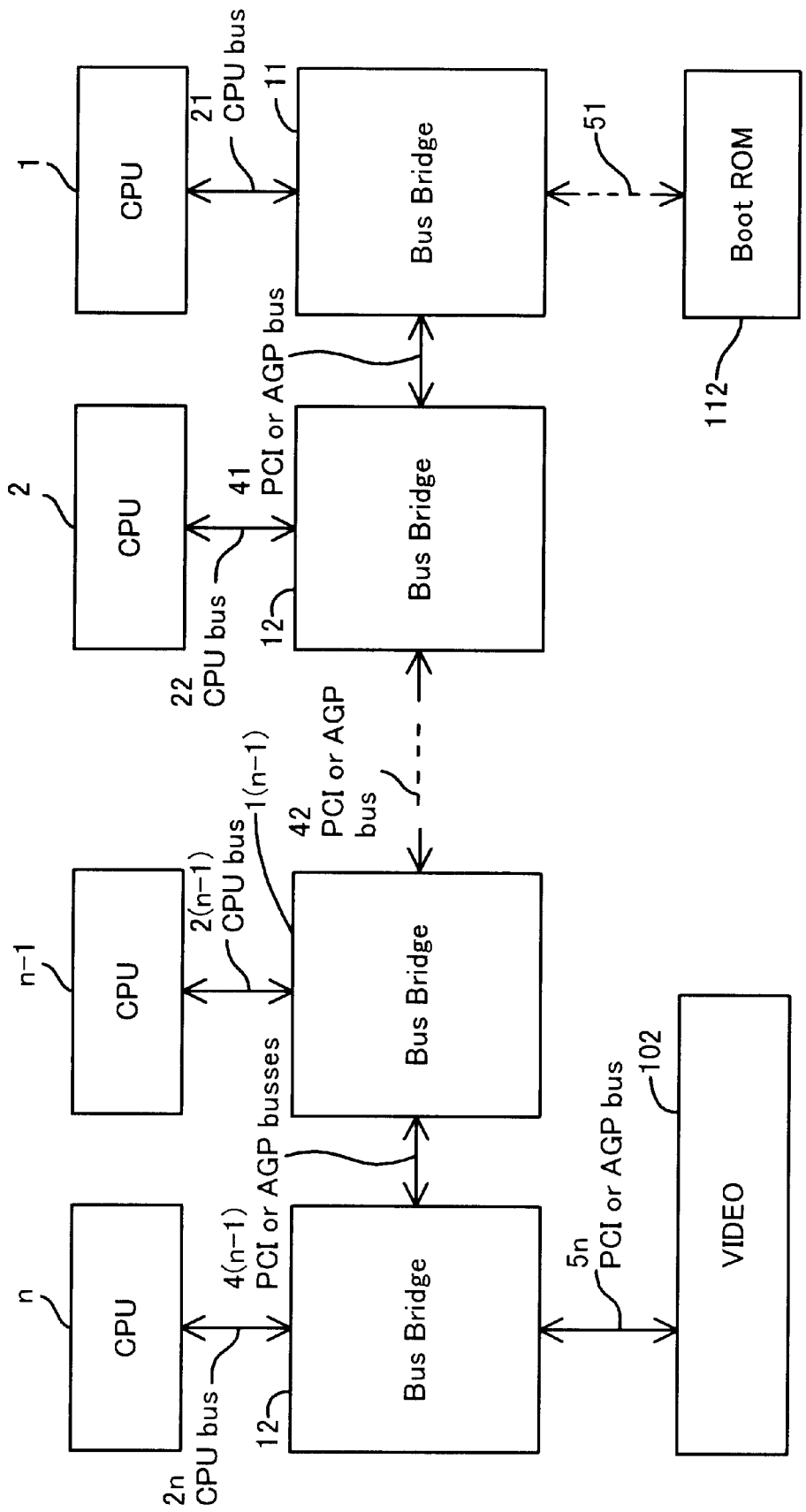
FIG. 2 illustrates a schematic configuration of the game system of the embodiment of the present invention.

FIG. 2 is a schematic configuration diagram for explaining the actions upon activation in the game system of this embodiment. CPUs 1 to n are connected via CPU busses 21 to 2n, respectively, to bus bridges 11 to 1n, respectively. The bus bridges 11 to 1n are connected in tandem by PCI or AGP busses 41 to 4(n−1). The boot ROM 112 connects via a PCI or AGP bus 51 to the bus bridge 11. The video processor unit 102 is linked via a PCI or AGP bus 5n to the bus bridge 1n.

Figure 3:
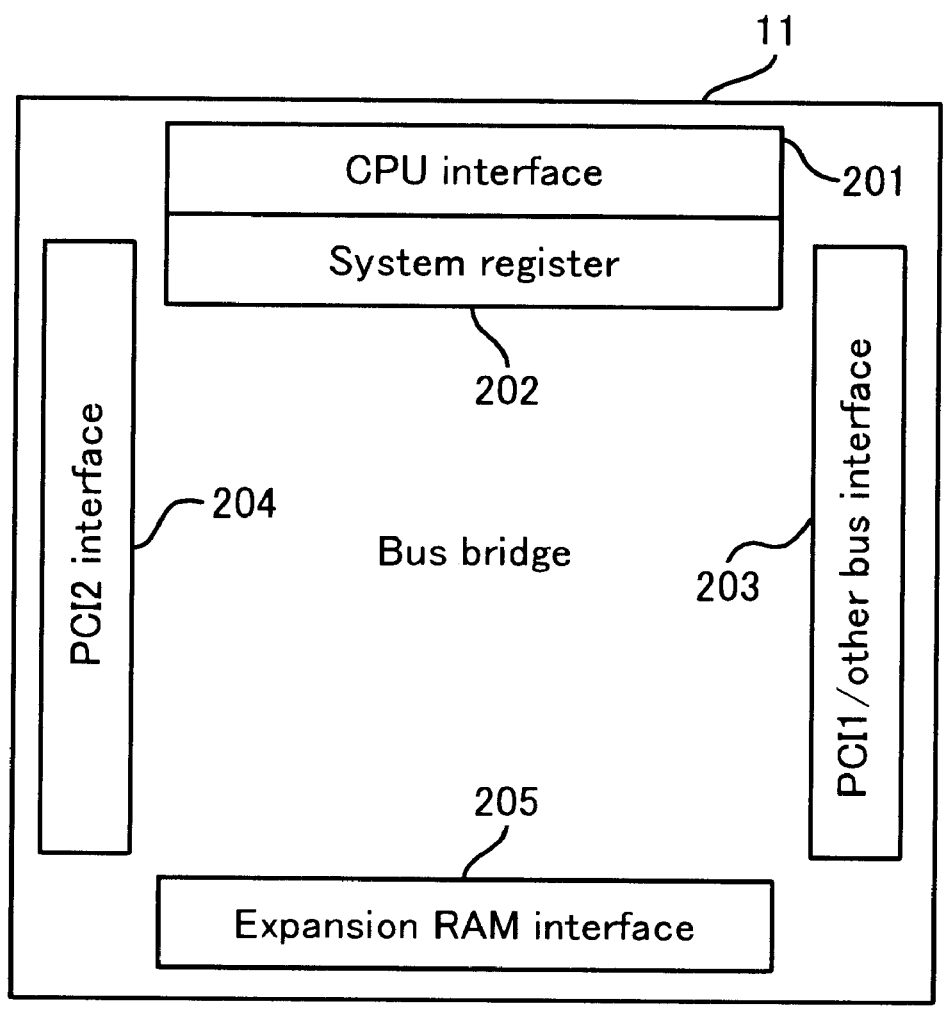
FIG. 3 illustrates an internal configuration of a bus bridge of the embodiment of the present invention.

FIG. 3 shows an internal configuration of the bus bridges 11 to 1n in accordance with the embodiment of the present invention. The bus bridges 11 to 1n each include a CPU interface 201 leading to corresponding one of the CPU busses 21 to 2n, a system register 202, a PCI1/other bus interface 203 linked to corresponding one of PCI or AGP busses 51 to 5n shared by the other busses, a PCI 2 interface 204 connected to corresponding one of the PCI or AGP busses 41 to 4(n−1), and an expansion RAM interface 205 coupled to the expansion RAM 101.

Figure 4:
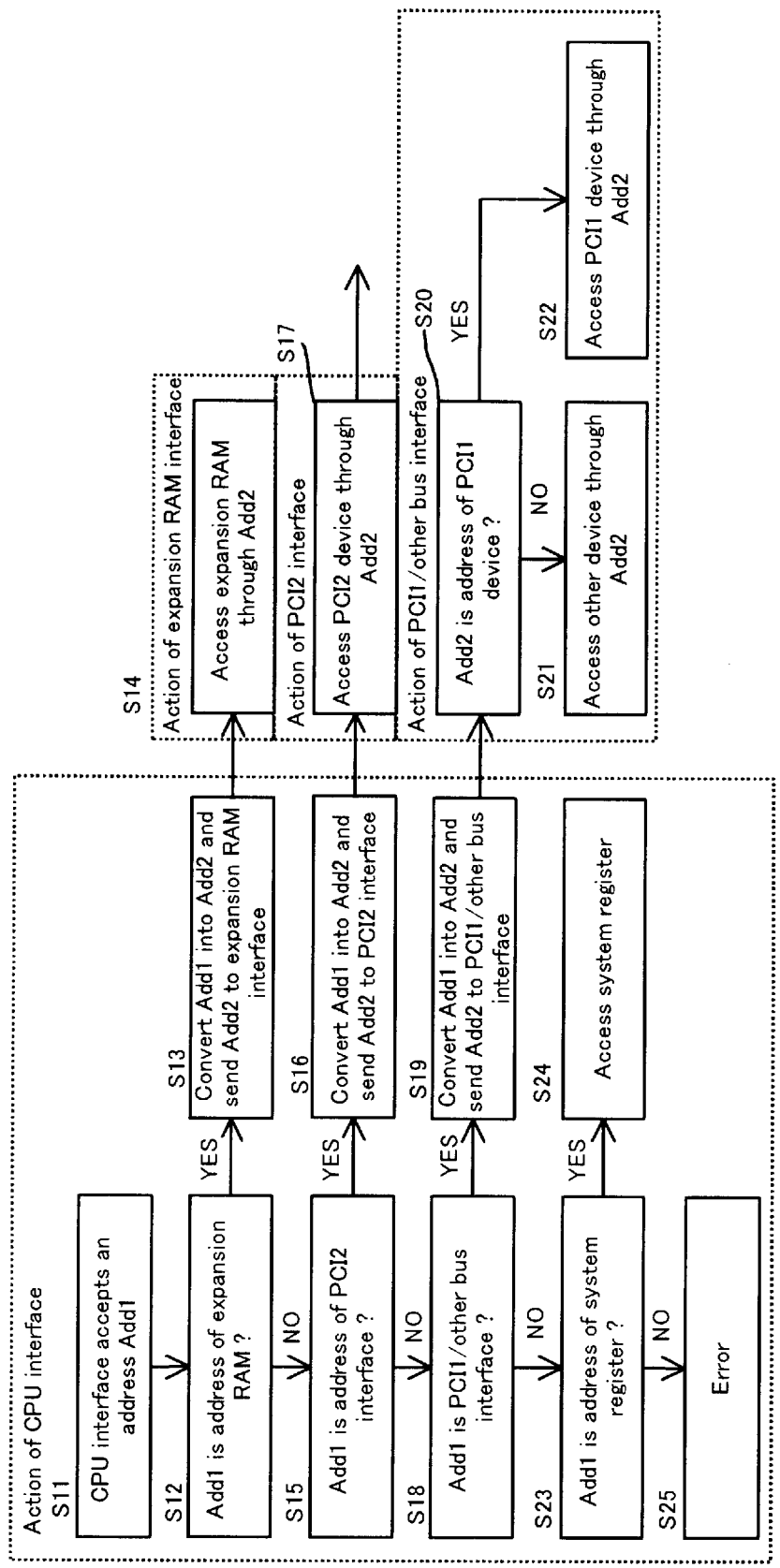
FIG. 4 is a flowchart of steps effected by the bus bridge upon access from a CPU.

FIG. 4 is a flowchart obtained when the bus bridges 11 to 1n have access from corresponding ones of the CPUs 1 to n. When the bus bridges 11 to 1n are accessed by the CPUs 1 to n, the CPU interface 201 accepts an address Add1 fed from corresponding one of the CPUs 1 to n (S11) and makes a judgment of the address Add1 (S12).

If the address Add1 is the address of the expansion RAM 101 (YES), then the CPU interface 201 converts the address Add1 into an address Add2 and sends the address Add2 to the expansion RAM interface 205 (S13). Then, the expansion RAM interface 205 gains access to the expansion RAM 101 through the address Add2 (S14).

On the contrary, when in step S12 the address Add1 is not the address of the expansion RAM 10 (NO), the address Add1 is subjected to a further judgment (S15). If the address Add1 is the address of the PCI2 interface 204 (YES), then the CPU interface 201 converts the address Add1 into an address Add2 and sends the address Add2 to the PCI2 interface 204 (S16). Then, through the address Add2, the PCI2 interface accesses a PCI2 device coupled to the PCI2 interface 204 (S17). The action of the PCI2 interface 204 will be described later in FIG. 5.

On the contrary, when in step S15 the address Add1 is not the address of the PCI2 interface 204 (NO), the address Add1 is further judged (S18). If the address Add1 is the address of the PCI1/other bus interface 203 (YES), then the CPU interface 201 converts the address Add1 into an address Add2 and sends the address Add2 to the PCI1/other bus interface 203 (Sl9). Then, the PCI1/other bus interface 203 makes a judgment of the address Add2 (S20). If the address Add2 is the address of the PCI1 device (YES), then the PCI1 device is accessed through the address Add2 (S22). If the address Add2 is not the address of the PCI1 device (NO), then the other bus device is accessed through the address Add2 (S21).

On the other hand, when in step S18 the address Add1 is not the address of the PCI1/other bus interface 203 (NO), the CPU interface 201 makes a further judgment of the address Add1 (S23). If the address Add1 is the address of the system register 202 (YES), then an access is made to the system register 202 (S24), whereas if the address Add1 is not the address of the system register 202 (NO), then an error is judged to bring the action to a stop (S25).

Figure 5:
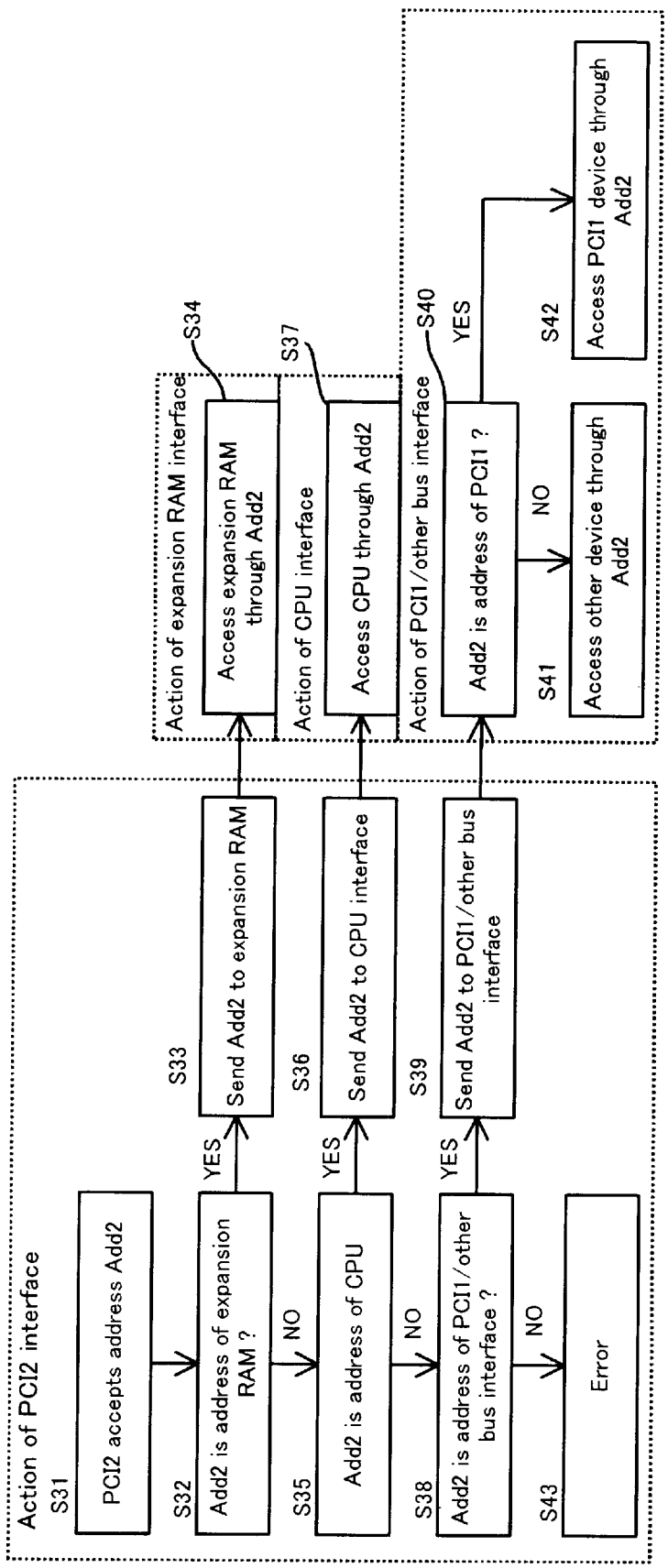
FIG. 5 is a flowchart of steps effected by the bus bridge upon access from a PCI2.

FIG. 5 is a flowchart obtained when the bus bridges 11 to 1n are accessed by way of the PCI2 interface 204. When the PCI2 interface 204 accepts an address Add2 (S31), it judges the address Add2 (S32). If the address Add2 is the address of the expansion RAM 101 (YES), then the address Add2 is sent to the expansion RAM interface 205 (S33). Then, the expansion RAM interface 205 gains access to the expansion RAM 101 through the address Add2 (S34).

On the contrary, when in step S32 the address Add2 is not the address of the expansion RAM 101 (NO), the address Add2 is subjected to a further judgment (S35). If the address Add2 is the address of corresponding one of the of the CPUs 1 to n (YES), then the PCI2 interface 204 sends the address Add2 to the CPU interface 201 (S36). Then, the CPU interface 201 gains access to the corresponding one of the CPUs 1 to n through the address Add2 (S37).

On the other hand, when in step S35 the address Add2 is not the address of corresponding one of the CPUs 1 to n (NO), the address Add2 is further judged (S38). If the address Add2 is the address of the PCI1/other bus interface 203 (YES), then the PCI2 interface 204 sends the address Add2 to the PCI1/other bus interface 203 (S39). Then, the PCI1/other bus interface 203 makes an judgement of the address Add2 (S40). If the address Add2 is judged to be the address of the PI1 device (YES), then the PCI1 device is accessed through the address Add2 (S42). If the address Add2 is not the address of the PI1 device (NO), then the other bus device is accessed through the address Add2 (S41).

On the contrary, when in step S38 the address Add2 is not the address of the PCI1/other bus interface, an error is judged to stop the action (S43).

FIGS. 6A to 6C illustrate memory maps of the bus bridges 11, 12 and In by way of example. FIG. 6A depicts a memory map of the bus bridge 11. The boot ROM 112 is coupled to the bus bridge 11 and located at an address Add2b when viewed from the bus bridge 11. Note that a reserved region of the memory map stores therein a program for allowing access to the other devices for example.

FIG. 6B depicts a memory map of the bus bridge 12. The bus bridge 11 being coupled to the bus bridge 12, the memory map is arranged such that the bus bridge 11 is located at the same address Add2b when viewed from the bus bridge 12.

FIG. 6C depicts a memory map of the bus bridge In. The bus bridge 1 (n−1) being coupled to the bus bridge in, the memory map is arranged in this case as well such that the bus bridge 1(n−1) is located at the same address Add2b. In this manner, the game system of this embodiment is configured such that when the respective bus bridges 11 to 1n gain access to the boot ROM 112, the adjacent bus bridges have the same address Add2b in the respective bus bridge memory maps.

FIGS. 7A to 7C illustrate memory maps of the CPUs 1, 2 and n. FIG. 7A shows a memory map of the CPU 1. Since the CPU 1 is associated with the bus bridge 11, the arrangement is such that the boot ROM 112 is located at the address Add1b when viewed from the CPU 1, in accordance with the memory map of the bus bridge 11 shown in FIG. 6A. More specifically, when the CPU 1 accesses the address Add1b of the bus bridge 11,the CPU interface 201 of the bus bridge 11 converts the address Add1b fed from the CPU 1 into the address Add2b and sends it to the boot ROM 112 so that the CPU 1 can gain access to the boot ROM 112. It is to be noted that the others region of the memory map of FIG. 7A stores therein, e.g., control programs for the CPU 1 and for the system register in the bus bridge 11.

FIG. 7B shows a memory map of the CPU 2. Since the CPU 2 is associated with the bus bridge 12, the arrangement is such that the boot ROM 112 is located at the same address Add1b when viewed from the CPU 2, in accordance with the memory map of the bus bridge 12 shown in FIG. 6B and with the memory map of the bus bridge 11 shown in FIG. 6A. More specifically, when the CPU 2 accesses the address Add1b of the bus bridge 12, the CPU interface 201 of the bus bridge 12 converts the address Add1b fed from the CPU 2 into the address Add2b and sends it to the bus bridge 11 so that the CPU 2 can gain access to the boot ROM 112 by way of the address Add2b of the bus bridge 11. Thus, by accessing the address Add1b in the address map of the CPU 2, it is possible for the CPU 2 to gain access to the boot ROM 112.

FIG. 7C shows a memory map of the CPU n. Since the CPU n is associated with the bus bridge 1n, the arrangement is in this case as well such that the boot ROM 112 is located at the same address Add1*b* when viewed from the CPU n, in accordance with the memory maps of the adjacently coupled bus bridges 1 (n−1), etc., and with the memory map of the bus bridge 11 shown in FIG. 6A. More specifically, when the CPU n accesses the address Add1*b* of the bus bridge 1*n*, the CPU interface 201 of the bus bridge 1*n* converts the address Add1*b* fed from the CPU n into the address Add2*b* and sends it to the bus bridge 1(n−1) so that the CPU n can gain access to the boot ROM 112 by way of the adjacent bus bridges 1(n−2), etc. Therefore, by accessing the address Add1*b*, it is also possible for the CPU n to gain access to the boot ROM 112.

In this manner, the game system of this embodiment employs the arrangement in which the adjoining bus bridges have the same address Add2*b* for access to the boot ROM in the respective bus bridge memory maps, so that the boot ROM can be accessed by accessing the address Add1*b* in the respective CPU memory maps. Thus, in the game system having a plurality of CPUs for high-speed image processing, the plurality of CPUs can be activated by a single boot ROM, contributing to a curtailment of costs of the game system. Furthermore, the boot ROM is located at the same address in the memory maps of the plurality of CPUs, so that the game programs are simplified and their creations are facilitated.

Figure 8:
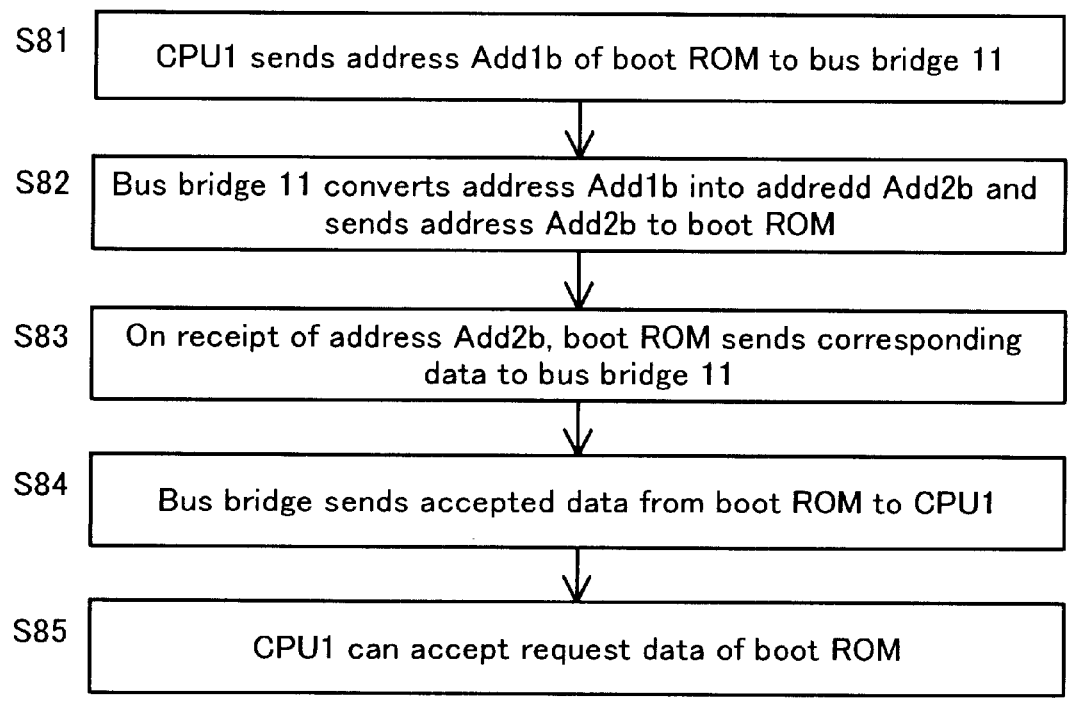
FIG. 8 is a flowchart of steps effected for receipt of data from a boot ROM by the CPU 1.

Referring then to flowcharts, description will be made of the case where the respective CPUs have access to the boot ROM 112. FIG. 8 is a flowchart of steps executed for the CPU 1 to accept data from the boot ROM 112. In case the CPU 1 has access to the boot ROM 112, the CPU 1 sends an address Add1*b* of the boot ROM 112 to the bus bridge 11 (S81). In response to this, the bus bridge 11 converts the address Add1*b* into an address Add2*b* and sends the address Add2*b* to the boot ROM 112 (S82).

On receipt of the address Add2*b*, the boot ROM 112 sends corresponding data to the bus bridge 11 (S83), and the bus bridge 11 sends the thus accepted data from the boot ROM 112 to the CPU 1 (S84). As a result of this, the CPU 1 can accept request data of the boot ROM 112 (S85).

Figure 9:
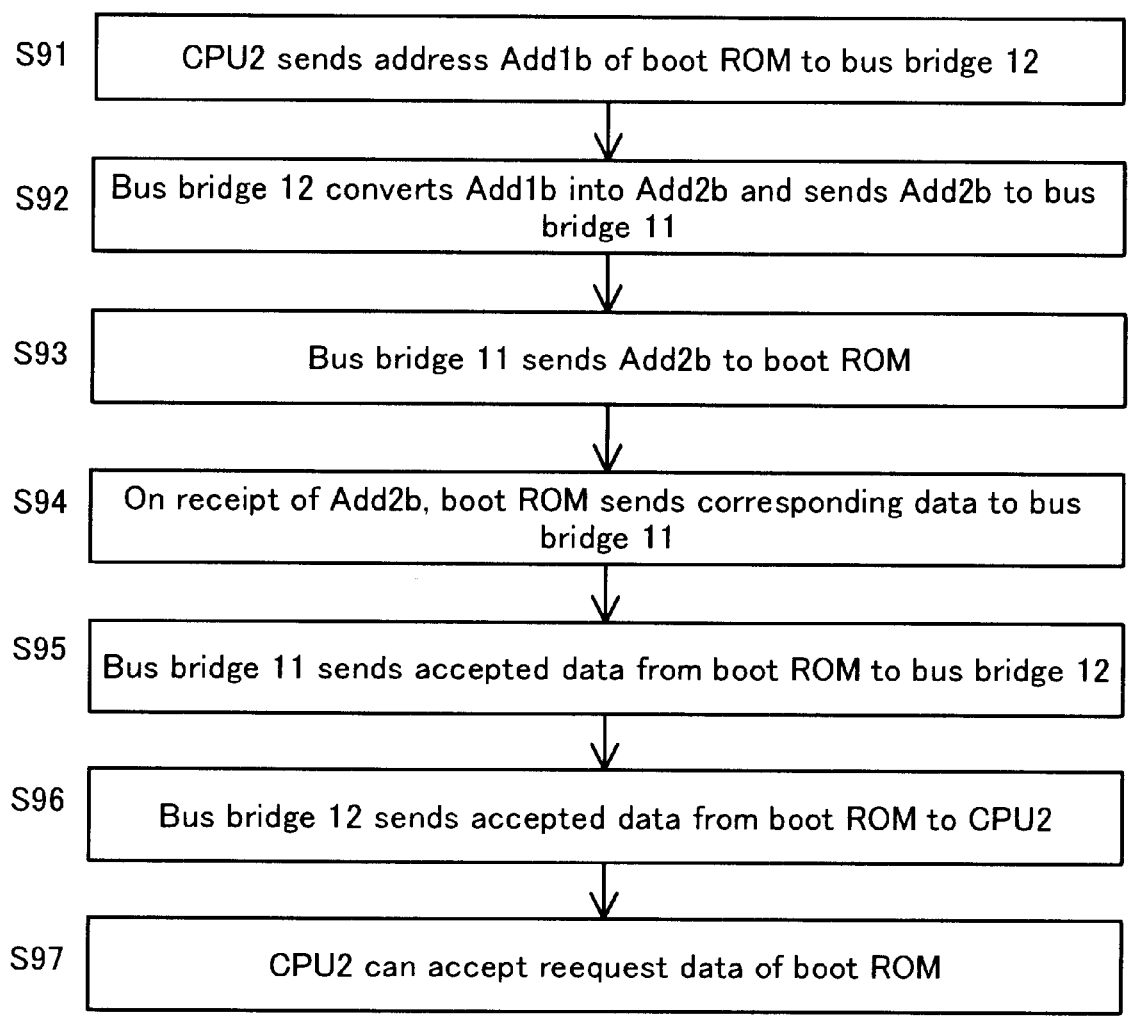
FIG. 9 is a flowchart of steps effected for receipt of data from a boot ROM by the CPU 2.

FIG. 9 is a flowchart of steps executed for the CPU 2 to accept data from the boot ROM 112. In case the CPU 2 has access to the boot ROM 112, the CPU 2 sends an address Add1*b* of the boot ROM 112 to the bus bridge 12 (S91). In response to this, the bus bridge 12 converts the address Add1*b* into an address Add2*b* and sends the address Add2*b* to the bus bridge 11 (S92). The bus bridge 11 in turn sends the address Add2*b* to the boot ROM 112 (S93).

On receipt of the address Add2*b*, the boot ROM 112 sends corresponding data to the bus bridge 11 (S94), and the bus bridge 11 sends the thus accepted data from the boot ROM 112 to the bus bridge 12 (S95). The bus bridge 12 in turn sends the thus accepted data from the boot ROM 112 to the CPU 2 (S96). As a result of this, the CPU 2 can accept request data of the boot ROM 112 (S97).

Figure 10:
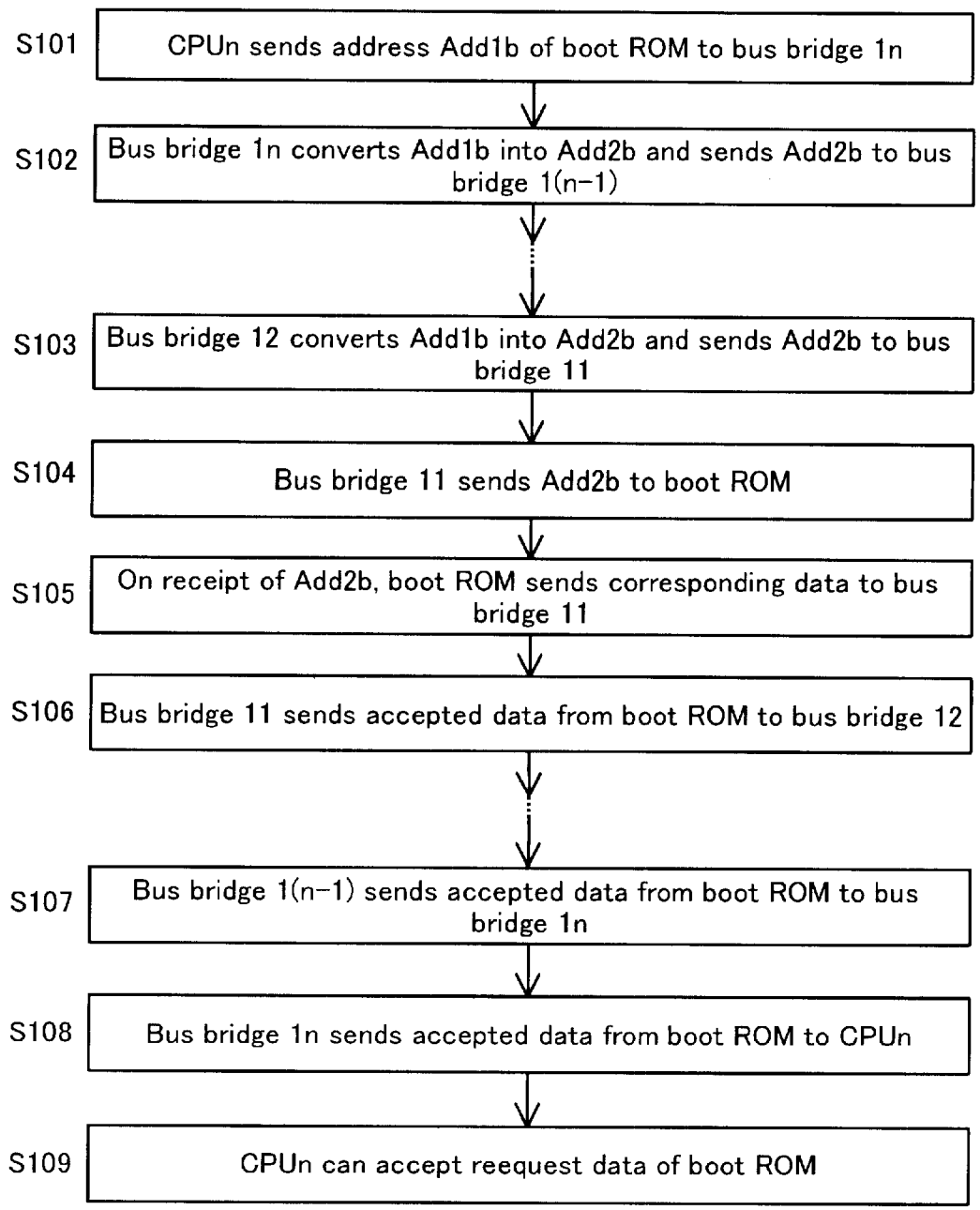
FIG. 10 is a flowchart of steps effected for receipt of data from a boot ROM by the CPU n.

FIG. 10 is a flowchart of steps executed for the CPU n to accept data from the boot ROM 112. In case the CPU n has access to the boot ROM 112, the CPU n sends an address Add1*b* of the boot ROM 112 to the bus bridge 1*n* (S101). In response to this, the bus bridge 1*n* converts the address Add1*b* into an address Add2*b* and sends the address Add2*b* to the bus bridge 1(n−1) (S102).

The address Add2*b* is further sent via the adjacent bus bridge to the bus bridge 12, which in turn sends the address Add2*b* to the bus bridge 11 (S103). The bus bridge 11 in turn sends the address Add2*b* to the boot ROM 112 (S104).

On receipt of the address Add2*b*, the boot ROM 112 sends corresponding data to the bus bridge 11 (S105), and the bus bridge 11 sends the thus accepted data from the boot ROM 112 to the bus bridge 12 (S106). The data from the boot ROM 112 is further sent by way of the adjacent bus bridge. The bus bridge 1(n−1) sends the accepted data from the boot ROM 112 to the bus bridge 1*n* (S107), which in turn sends the thus accepted data from the boot ROM 112 to the CPU n (S108). As a result of this, the CPU n can accept request data of the boot ROM 112 (S109).

In the game system of this embodiment in this manner, the respective CPUs have only to access the address Add1*b* since their respective bus bridges convert the address Add1*b* into the address Add2*b* for the access to the boot ROM 112, whereby it is possible to confer an appropriate address on the boot ROM 112 without customizing the CPUs themselves, allowing use of general purpose CPUs.

Figure 11:
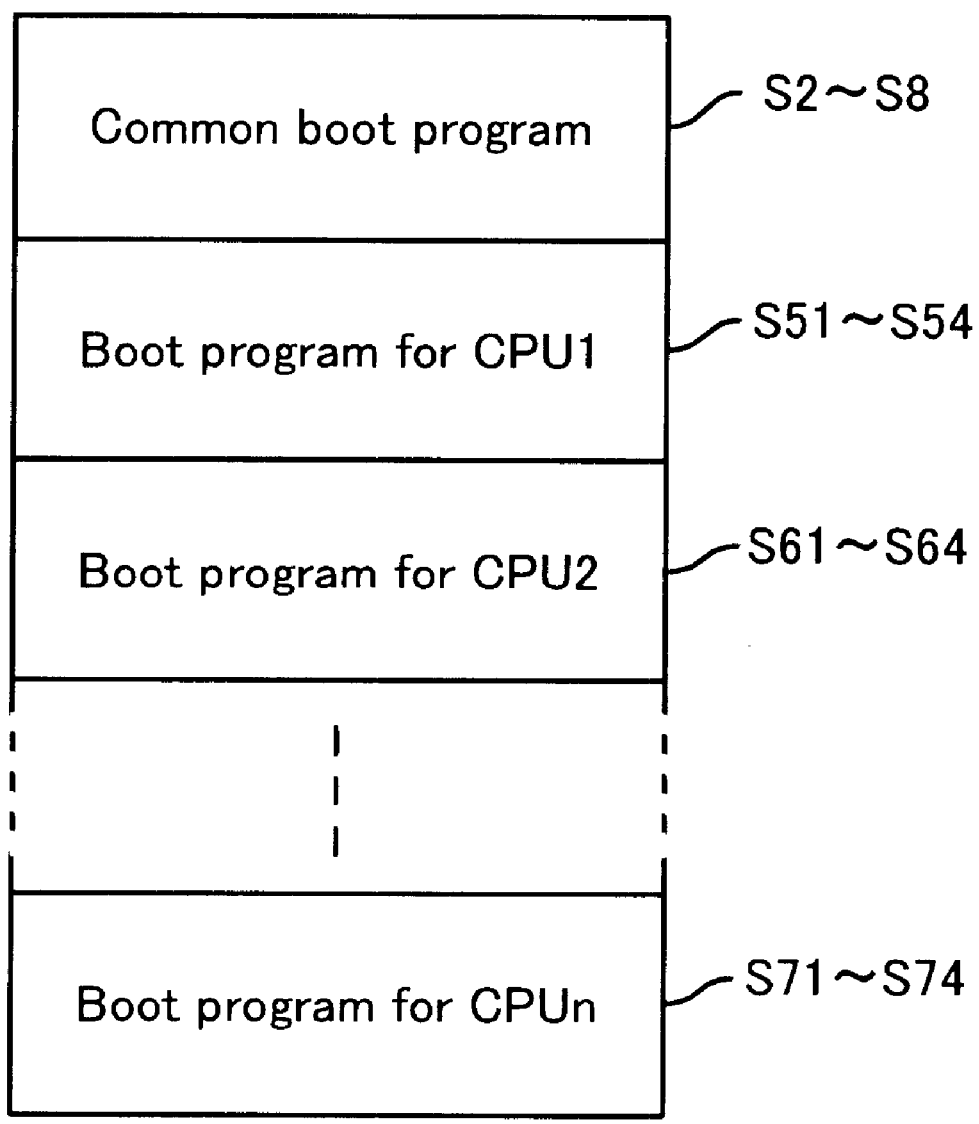
FIG. 11 is a diagram showing the array of programs stored in a boot ROM of the embodiment of the present invention.

FIG. 11 illustrates an example of arrangement of programs for the boot ROM 112 of this embodiment. The boot ROM 112 stores therein a common boot program (S2 to S8) for e.g., initializing the common part of the system registers in the plurality of CPUs and bus bridges and for e.g., identifying ID numbers of the bus bridges, and individual boot programs (S51 to S54, etc.) for the respective CPUS.

Figure 12:
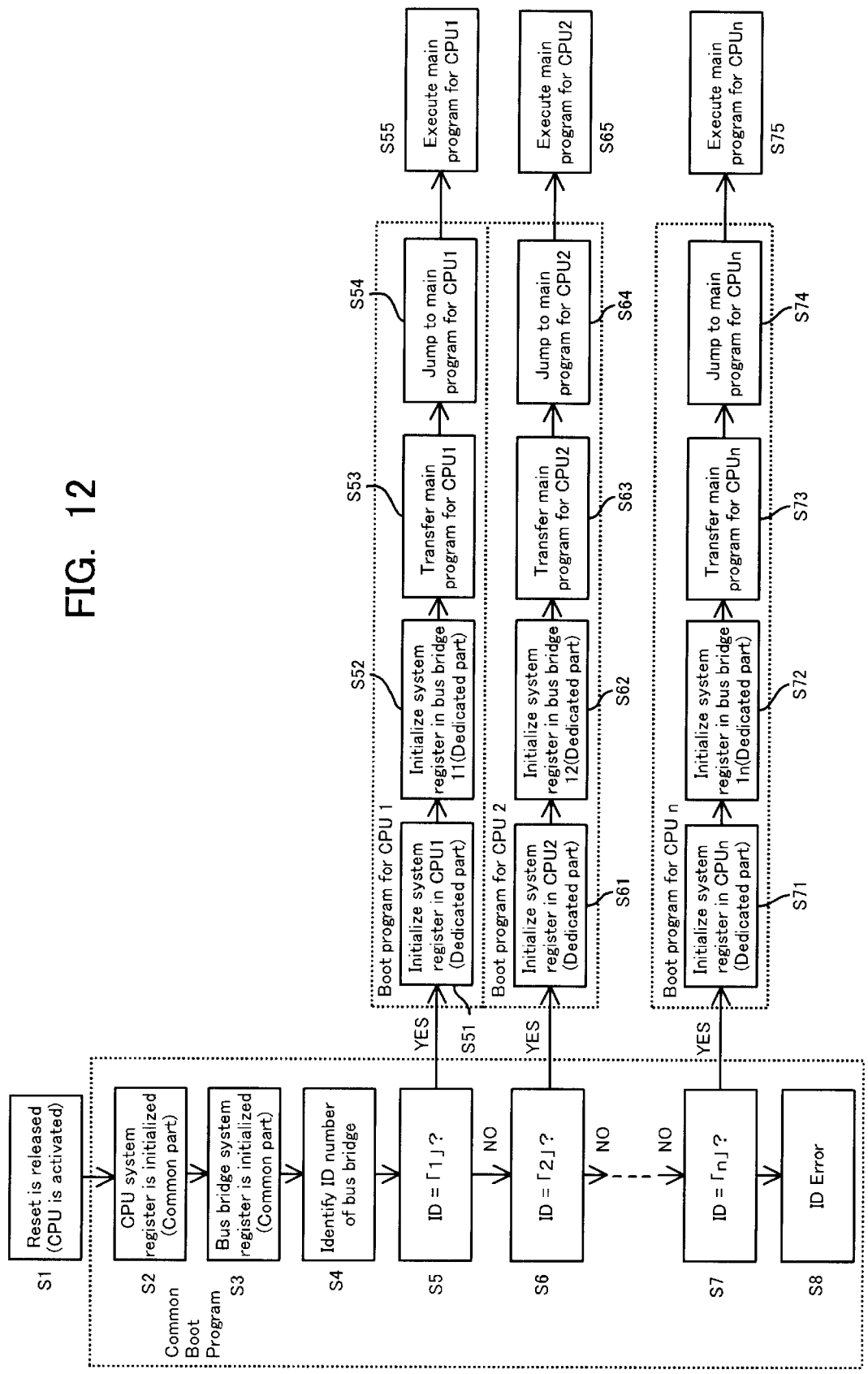
FIG. 12 is a flowchart of steps executed by a boot program of the embodiment of the present invention.

FIG. 12 is an exemplary flowchart of the boot programs stored in the boot ROM 112 of this embodiment. Initialization of the game system of this embodiment is carried out as follows.

When reset is released with the supply of power, each CPU is activated (S1). It is to be understood that in case a plurality of CPUs are reset at the same time and the plurality of CPUs have simultaneous accesses to the boot ROM, until one CPU completes its access the remaining CPUs stand by.

After activation, the CPUs start the execution of the common boot program. First, the common part of all the CPU system registers is initialized (S2), and the common part of all the bus bridge system registers is initialized (S3). The ID number of a bus bridge is then identified (S4). If the ID number of the bus bridge is 1 (YES), then control jumps to a boot program for CPU 1. If not (NO), the procedure goes to the next step (S5).

Similarly, if the ID number of the bus bridge is 2, then control jumps to a boot program for CPU 2 (S6), and if the ID number of the bus bridge is n, then jump is made to a program for CPU n (S7). In the event that the ID number of a bus bridge can not be identified, an ID number error is judged and the activation is stopped (S8).

When in step S5 the ID number of the bus bridge is 1, the program for CPU 1 is executed, first allowing initialization of the dedicated part of the system register in the CPU 1 (S51) and initialization of the dedicated part of the system register in the bus bridge 11 (S52). A main program for CPU 1 is then transferred from a ROM board or the like (S53). After the transfer, control jumps to the main program (S54) to start execution of the main program for CPU 1 (S55). It will be understood that in case the ID number of the bus bridge is 2 or n, there is started execution of the boot program for CPU 2 (S61 to S64) and of the boot program for CPU n (S71 to S74).

In this manner, the game system of this embodiment allows a plurality of CPUs to be activated by a single boot ROM, thereby achieving a simplified game system configuration. Furthermore, the single boot ROM separately stores the boot program common to the plurality of CPUs and the individual boot programs, thereby making it possible to reduce the storage regions in the boot ROM and to cut down the costs of the game system.

Figure 13:
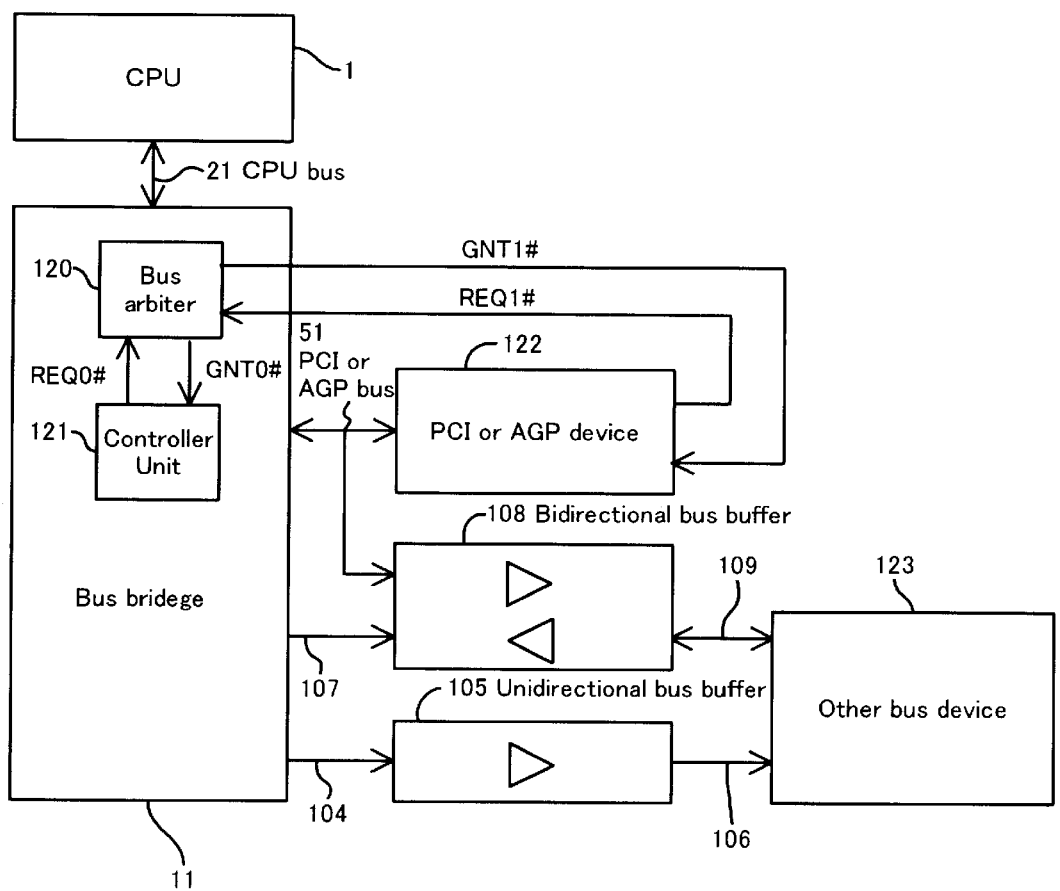
FIG. 13 illustrates a connection to the other bus devices of the embodiment of the present invention.
Figure 14:
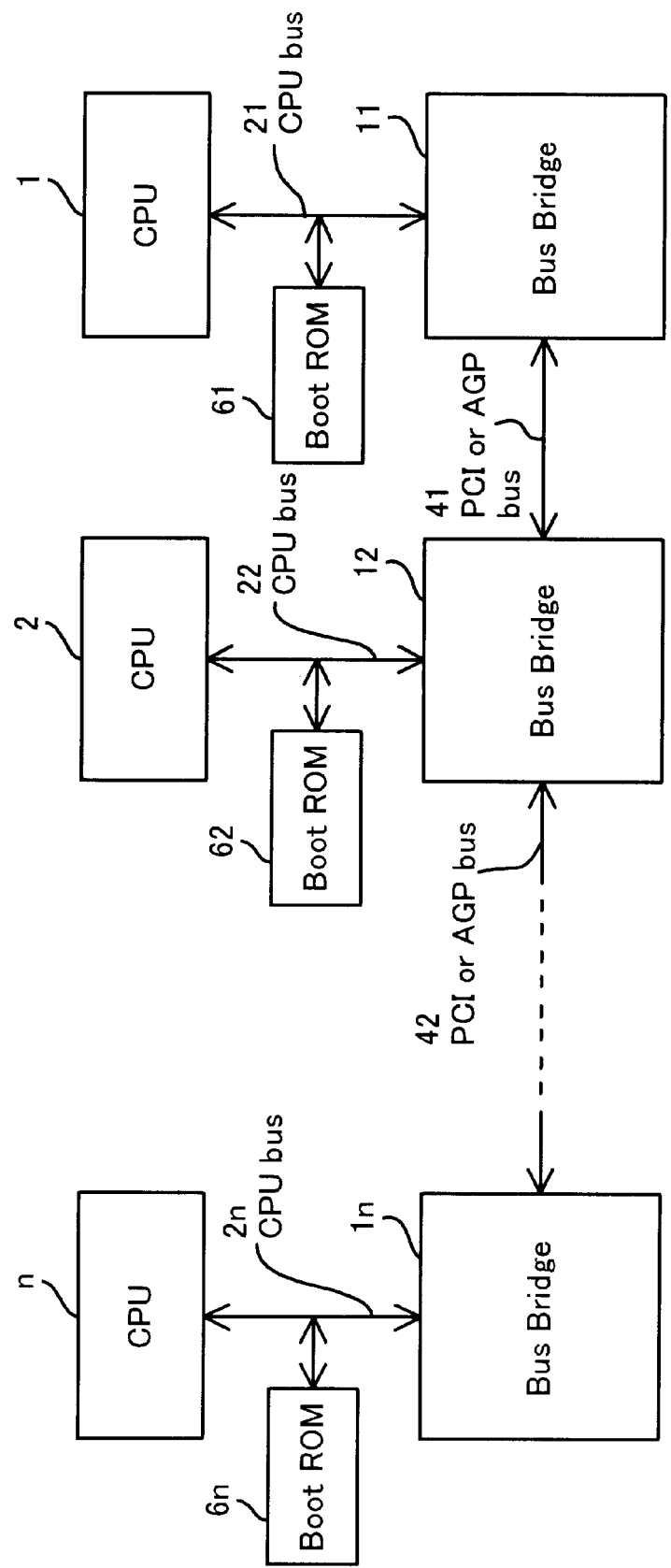
FIG. 14 is a schematic configuration diagram of a conventional system.
Figure 15:
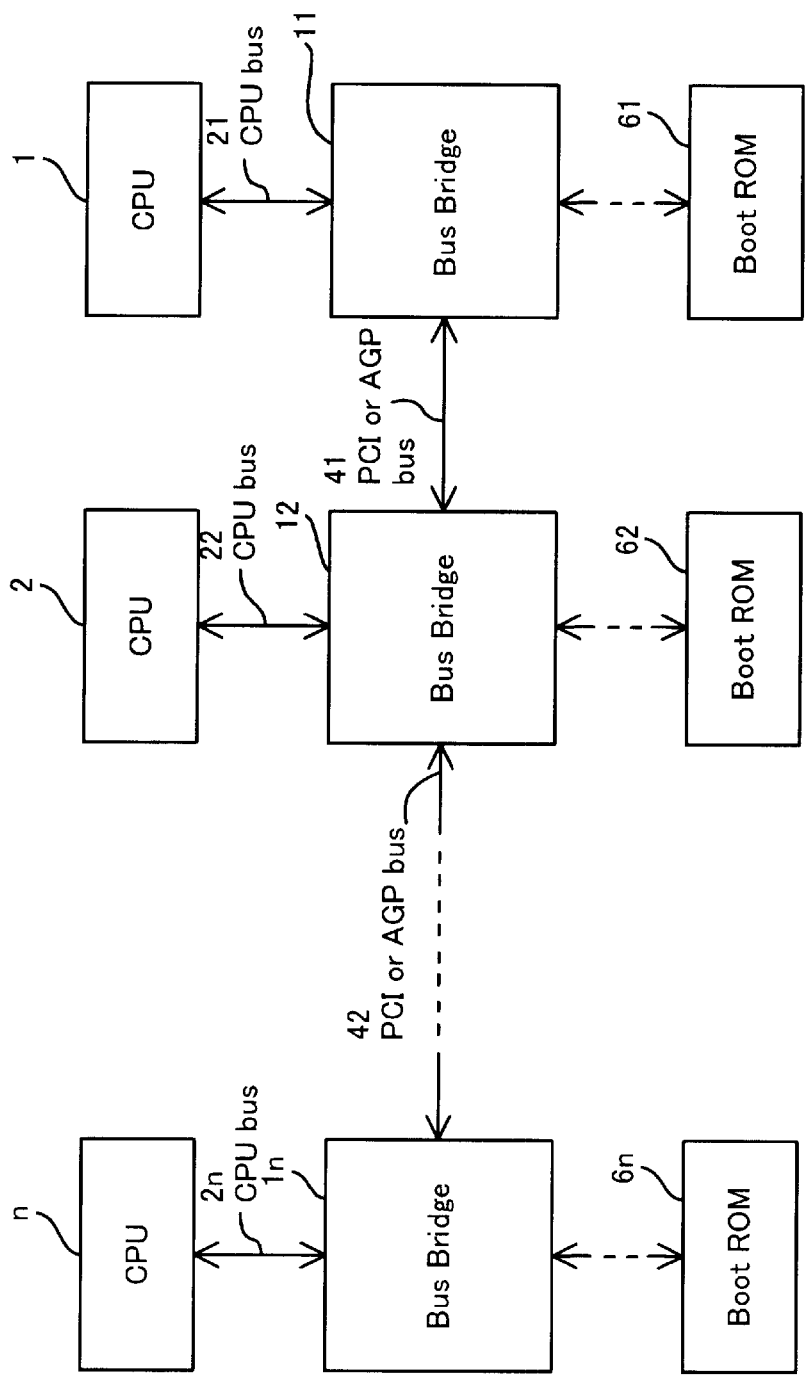
FIG. 15 is a schematic configuration diagram of a conventional system.
Figure 16:
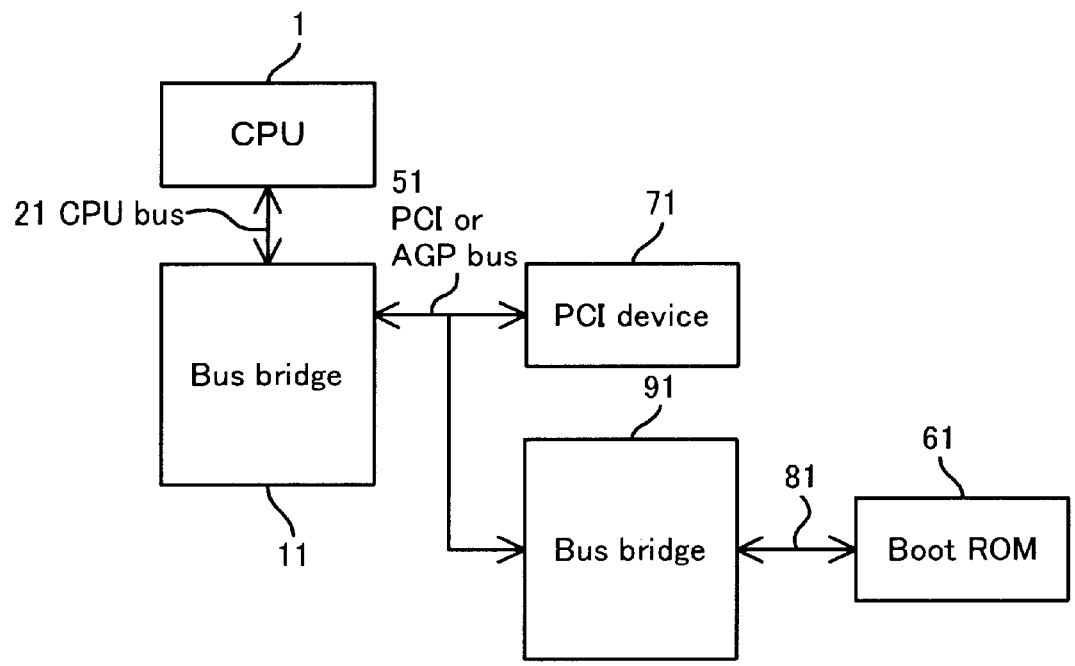
FIG. 16 is a connection diagram of the conventional other bus devices.
Figure 17:
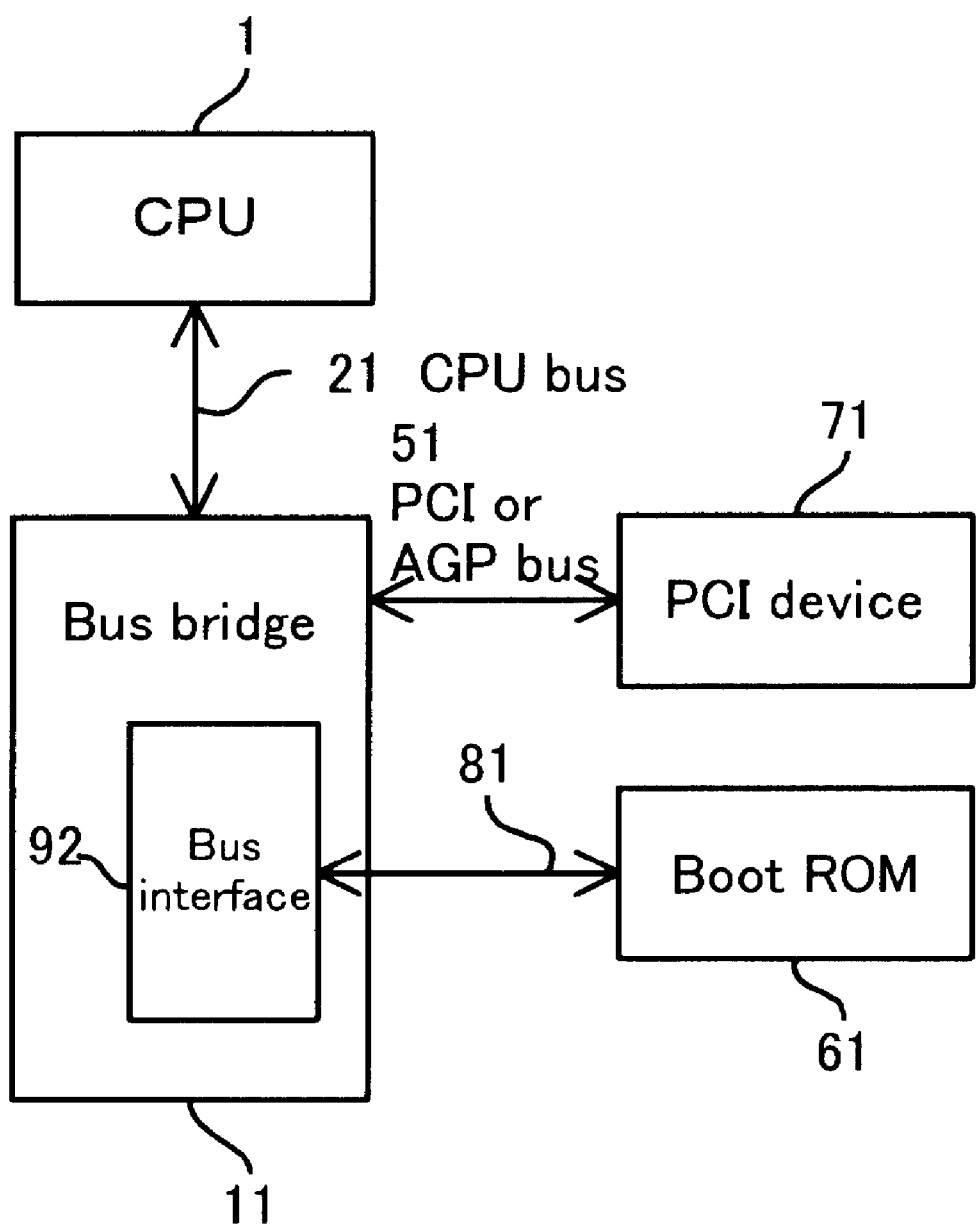
FIG. 17 is a connection diagram of the conventional other bus devices.

Description will then be made of reduction of the number of pins of the bus bridge connecting the boot ROM or other elements in the game system of this embodiment. FIG. 13 is a detailed connection diagram of the case where the bus bridge 11 shown in FIG. 1 is connected via the bidirectional bus buffer 108 to the boot ROM 112 or other elements. Since this embodiment employs the PCI or AGP bus 51 partly shared for connection to the boot RAM 112 or other elements, it is possible to reduce the number of pins of the bus bridge to a large extent, as compared with the case of the direct connection to the boot ROM with the provision of the bus interface in the bus bridge as seen in FIG. 17.

As used herein, other bus devices 123 in FIG. 13 refer to bus devices not allowing the direct connection to the PCI or AGP bus and includes the address decoder 111, the boot ROM 112, the serial port 113, the sound unit 114, the I/O unit 115, the security unit 116, the communication board 117, the ROM board 118 and the SCSI board 119. A PCI or AGP device 122 of FIG. 13 refers to a device allowing the direct connection to the PCI or AGP bus and includes herein the video processor unit 102 shown in FIG. 1.

Although in the game system of this embodiment the bus bridge 11 and the PCI or AGP device 122 are connected to each other by way of all signal lines of the PCI or AGP bus 51, i.e., 32 AD (address data) busses and 17 control lines, the bus bridge 11 and the bidirectional bus buffer 108 are connected to each other through part of the PCI or AGP bus 51, namely, 32 AD busses and 4 CBE (command bit enable) busses and through the signal line 107. Thus, the bus bridge 11 can use the PCI or AGP bus 51 as 32 AD busses and 4 CBE busses for the access to the other bus devices 123, so that the number of pins can remarkably be reduced as compared with the case of direct connection to the other bus devices 123 with the provision of the bus interface in the bus bridge 11.

Reference is then made to FIG. 13 to explain actions effected upon access of the CPU 1 to the other bus devices 123. When the CPU 1 has access to the bus bridge 11 by way of the CPU bus 21, the controller unit 121 of the bus bridge 11 sets an REQ0# signal active, to issue a request for use of the PCI or AGP bus 51 to a bus arbiter unit 120 of the bus bridge 11. At that time, if the PCI or AGP bus 51 is in idle (unused state), then the bus arbiter unit 120 sets a GNT0# signal active, to confer a permission to use the PCI or AGP bus 51 on the controller unit 121.

At that time, in the event that the PCI or AGP device 122 sets a REQ1# signal active to issue a request for use of the PCI or AGP bus 51 and that the bus arbiter unit 120 sets a GNT1# signal active to confer a use permission on the PCI or AGP device 122, the bus arbiter unit 120 is kept from setting the GNT0# signal active and waits for the PCI or AGP bus 51 becoming idle.

On acquisition of the permission to use the PCI or AGP bus 51, the bus bridge starts access to the other bus devices 123. First, the bus bridge 11 sends an output enable signal to the bidirectional bus buffer 108 by way of the signal line 107 to connect the PCI or AGP bus 51 and the data bus 109, the bus bridge 11 further providing a control of direction of data flow by means of a direction control signal.

Then, for the access to the other bus devices 123, the bus bridge 11 sends an address strobe signal, a data output enable signal, a data write enable signal, etc., to the other bus devices 123 by way of the signal line 104, the unidirectional bus buffer 105 and the signal line 106.

In the game system of this embodiment in this manner, the PCI or AGP bus 51 is used also as the AD bus and CBE bus for the access to the other bus devices 123, with the result that the number of pins can significantly be reduced and the costs of the bus bridge 11 and of the entire game system can be curtailed as compared with the case where the bus bridge is provided with a bus interface for direct connection to the other bus devices 123.

Although sharing of the PCI or AGP and the other busses has been described in the above embodiment, the present invention is applicable to the case of sharing of the busses having different standards (e.g., signal levels, the number of busses, timings (synchronism/asynchronism)).

According to the present invention as set forth hereinabove, a plurality of CPUs can be activated by a single boot ROM so that the costs of the game system is reduced. Furthermore, by virtue of connection of the boot ROM to the bus bridge, the load on the CPU bus is reduced to achieve a high-speed activation, as compared with the configuration in which the boot ROM is connected to the CPU bus.

Moreover, due to the sharing of part of the PCI or AGP bus for the connection to the boot ROM or other devices, the number of pins of the bus bridge can be reduced and the costs of the bus bridge and of the game system can be cut down.

While a particular embodiment of the present invention has been illustrated and described, it would be obvious to those skilled in the art that various other changes and modifications can be made without departing from the spirit and scope of the present invention.

What is claimed is:

1. A system having a plurality of CPUs connected to a plurality of corresponding bus bridges which are connected in tandem, wherein one of said plurality of bus bridges is associated with a memory which stores therein a common boot program for activating said plurality of CPUs in common, and individual boot programs for activating individually said plurality of CPUs, and wherein said CPU connected to said bus bridge associated with said memory gains access to said memory by accessing a predetermined address of said bus bridge, and wherein the remainder of said plurality of CPUs gain access to the same address as said predetermined address, of said bus bridges to which said remainder are respectively connected, the thus accessed bus bridge having access to said memory by accessing the same address as said predetermined address, of the other bus bridges adjacent toward said bus bridge associated with said memory.

2. A system comprising:

a plurality of bus bridges connected in tandem;

a plurality of CPUs connected to corresponding ones of the plurality of bus bridges; and a memory associated with one of the plurality of bus bridges, storing therein a common boot program which activates the plurality of CPUs in common and individual boot programs which activate individually the plurality of CPUs, wherein the one of the plurality of bus bridges is connected to both a predetermined device and the memory;

the predetermined device being connected to the one of the plurality of bus bridges via the predetermined bus;

the memory being connected to the one of the plurality of bus bridges via a part of the predetermined bus;

the memory being connectable to another bus different from the predetermined bus; and the plurality of CPUs gain access to the memory via the part of the predetermined bus.

3. The system according to claim 2, wherein the memory is connected to the one of the plurality of bus bridges by way of a bidirectional bus buffer.

4. The system according to claim 2, wherein said predetermined bus is a PCI or AGP bus.

5. The system according to claim 2, wherein the part of said predetermined bus is an AD bus and a CBE bus.

6. A system having a plurality of CPU connected to a plurality of corresponding bus bridges which are connected to one another through busses, said system comprising:

a memory connected to one of said plurality of bus bridges, said memory storing therein a common boot program for initializing said plurality of CPUs in common, said memory storing therein individual boot programs for individually initializing said plurality of CPUs, wherein said plurality of bus bridges convert an address fed from said plurality of CPUs associated therewith in a corresponding manner, into a predetermined address, said plurality of bus bridges gaining accesses to said memory through said predetermined address.

* * * * *